Patented Feb. 21, 1928.

1,659,931

UNITED STATES PATENT OFFICE.

EDOUARD URBAIN, OF PARIS, FRANCE, ASSIGNOR TO URBAIN CORPORATION, A CORPORATION OF DELAWARE.

MANUFACTURE OF AGGLOMERATED CARBONACEOUS MATERIAL.

No Drawing. Application filed April 29, 1924, Serial No. 709,885, and in France June 25, 1923. Renewed July 20, 1927.

This invention relates to a process for the manufacture of an agglomerated carbonaceous material with a very high absorptive power.

The agglomeration renders it possible to regulate the physical resistance of the material to suit its various uses; and also to obtain a product having a higher specific gravity than that of ordinary charcoals. Further, it permits the manufacture of a product of uniform size and shape and allows the shape to be varied according to requirements. Therefore it is possible to avoid the crushing and consequent choking up of the absorptive material, which sometimes happen with other kinds of carbonaceous material, to reduce the size of the apparatus, and to obtain an even distribution throughout the layer of material of the gases or vapours to be treated.

Suitably carbonized charcoal, or peat, lignite or like material is pulverized to an appropriate fineness, so as for instance to pass through a 100 mesh sieve, and is then treated with acid or with a solution of a completely or partially volatile salt.

An agglomerant is afterwards added which must be insoluble in the liquid used and such as will not penetrate into the pores of the carbonaceous material, for instance gluten.

The pasty mass obtained is either extruded or rolled, stamped or moulded etc. and when necessary cut into uniform pieces. It is then dried and calcined under vacuum or in an atmosphere of inert gases at a temperature exceeding 800° C. Vacuum or an atmosphere of inert gas is used to prevent the carbon from being oxidized as a mass, as will be the case if steam or carbon dioxide is passed through the retort in which the carbon is heated. Various non-oxidizing gases may be used to create this atmosphere, or if only a small amount of air is originally present in the retort, this will be displaced by the fumes of the acid or volatile salt used, giving substantially the same effect.

The carbonaceous material thus prepared is suitable for many uses. However, if sulphuric acid or sulphates, phosphoric acid or phosphates have been used in its manufacture, sulphides, phosphides etc. will be found in the ash, and they might hinder the absorption of certain products such as acid or moist vapours.

In such cases the carbonaceous material is washed during the manufacturing process with a suitable solution, for instance with dilute hydrochloric acid and afterwards with water, in order to eliminate the impurities it contains. The material is then finally calcined at about 300° C. If no washing is done, the second calcination will not ordinarily be necessary.

Attention is called to my Patent No. 1,610,399, issued December 14, 1926, which was co-pending with the present application and which includes claims specifically covering a process involving the use of phosphoric acid or phosphates, and my co-pending application, Serial No. 25,707, filed April 24, 1925, which describes a process involving the use of phosphoric acid and sulphuric acid.

What I claim is:

1. The process of producing active carbon which comprises the step of heating carbonaceous material in the presence of a reagent containing an acid radical in a substantially non-oxidizing atmosphere to a temperature above 800° C.

2. A process as defined in claim 1, further characterized by a subsequent washing with hydrochloric acid.

3. A process as defined in claim 1, in which the carbonaceous material used comprises an organic agglomerant which will not penetrate into the pores of the material.

In testimony whereof I hereunto affix my signature.

EDOUARD URBAIN.